PERFORATED TAPE READER

Filed June 27, 1966 4 Sheets-Sheet 1

ANDRZEJ POTYNSKI
RYSZARD RAWSKI
INVENTORS

BY
Stevens, Davis, Miller & Mosher
ATTORNEYS

Aug. 18, 1970 A. POTYNSKI ET AL 3,524,574
PERFORATED TAPE READER
Filed June 27, 1966 4 Sheets-Sheet 2

ANDRZEJ POTYNSKI
RYSZARD RAWSKI
INVENTORS

BY
Stevens, Davis, Miller & Mosher
ATTORNEYS

PERFORATED TAPE READER

Filed June 27, 1966

ANDRZEJ POTYNSKI
RYSZARD RAWSKI
INVENTORS

BY
Stevens, Davis, Miller & Mosher
ATTORNEYS

INVENTORS
ANDRZEJ POTYNSKI
RYSZARD RAWSKI

BY Stevens, Davis, Miller & Mosher
ATTORNEYS

United States Patent Office 3,524,574
Patented Aug. 18, 1970

3,524,574
PERFORATED TAPE READER

Andrzej Potynski, Grodzisk Mazowiecki, and Ryszard Rawski, Warsaw, Poland, assignors to Politechnika Warszawska, Warsaw, Poland Filed June 27, 1966, Ser. No. 560,529
Claims priority, application Poland June 26, 1965, P 109,739, P 109,740
Int. Cl. B65h 29/52
U.S. Cl. 226—198 4 Claims

ABSTRACT OF THE DISCLOSURE

A perforated tape reader equipped with a device for varying the spacing of tape guides. The device consists of non-movable blades and movable blades controlled by cam means to be selectively protruded and retracted to vary the spacing of the tape guides.

Perforated tape readers of the prior art show some faults which will be described below.

Devices for changing the spacing of guides applied till now in readers are rather primitive ones, sometimes inconvenient in servicing, and the guides alone are short which is a cause of rapid wear and of damage to the tape.

The wheel elements reading the guiding track, in order to perform a correct reading, require an application of a tape having an exact width. In hitherto known systems of braking the tape, only one brake was applied consisting of an electromagnet armature performing a free rectilinear motion, and pressing the braked tape directly against the solenoid. If at the moment of braking, in the armature air-gap there is a joint of the tape glued on strapped joint or lap joint instead of a non-glued tape, so the width of the armature air-gap is increased, this causes an important decrease of the electromagnetic force between poles of the solenoid and the armature and in consequence a notable increase of braking distance and braking time.

The drive of the tape in known devices is performed by means of a pressing roll which presses the tape against a continuously moving drive roll. In order to achieve a quick starting the pressing roll, with the tape resting at standstill, is lightly pressed against the driving roll by means of a spring. In the course of operation, however, the pressing is obtained by means of an electromagnet. According to such a system, at the moment of braking the pressing electromagnet is de-energized, but the pressing roll continues to be lightly pressed against the tape by means of the spring, which causes a pulling the tape by the driving roll, and thus enlarges the braking distance.

The device of the present invention is set forth in the following specification and claims and is illustrated in the accompanying drawings dealing with several embodiments of the present invention. Reference is made now to the drawings in which:

Figure 1:
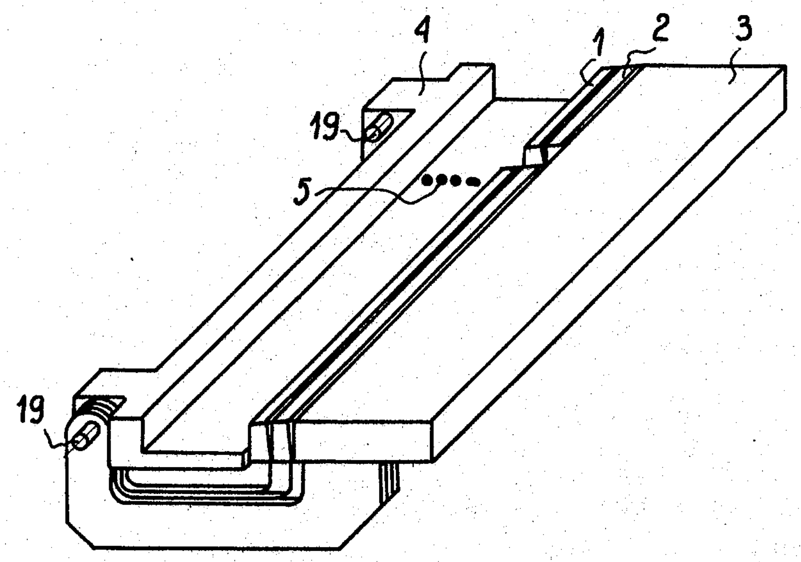
FIG. 1 is a perspective view of a first embodiment of the invention.
Figure 3:
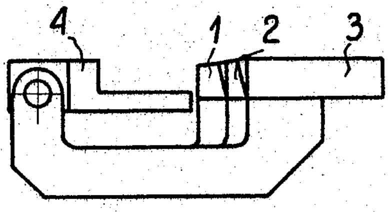
FIGS. 3 to 5 are end views of the first embodiment showing the operational sequence.
Figure 4:
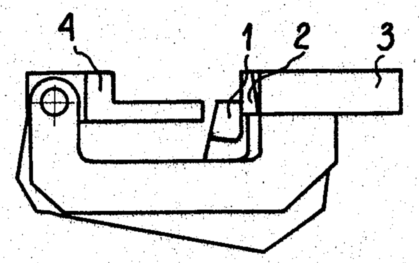
Figure 5:
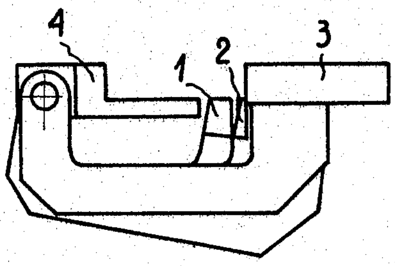

The guide of changeable width shown in FIG. 1 consists of a non-movable blade 4 and movable blades 1 and 2 and of a pushmember 3, rotationally guided as shown in FIG. 1 or by advance movement in such way, that blades 1 or 1 and 2 can be depressed down to the level of the bottom portion of the blade 4 so that the width of the guide can be changed by steps, as shown in FIGS. 3, 4 and 5.

Figure 2:
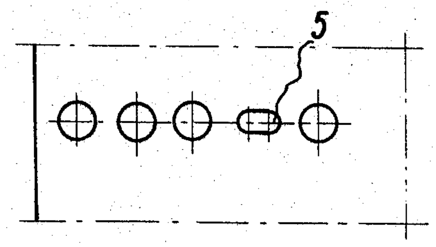
FIG. 2 is a plan view showing the reading element.

The pushmember 3 rests upon a protrusion of the blade 2, and this subsequently upon a protrusion of the blade 1. In order to introduce the tape in the guide and under the reading elements the pushmember 3 should be pressed down to stop. Then the blades 2 and 1 and the pushmember 3 descend down to the level of the bottom portion of the non-movable blade 4. In the blade 4 there is a reading element 5, elongated in the direction of the width of the tape, shown in FIG. 2. Due to the reading element 5, the system is made insensitive to big deviations of the tape width without any deterioration of the resolving power.

Figure 6:
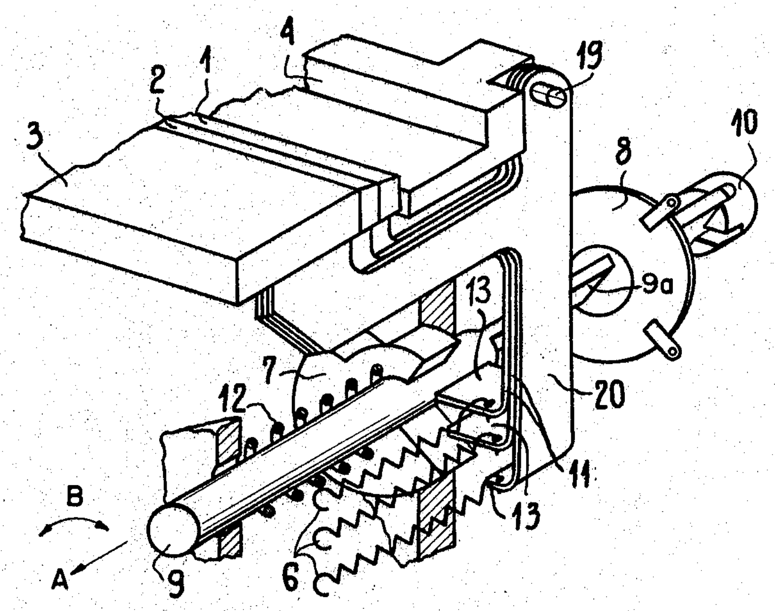
FIG. 6 is a perspective view of a second embodiment of the invention.
Figure 7:
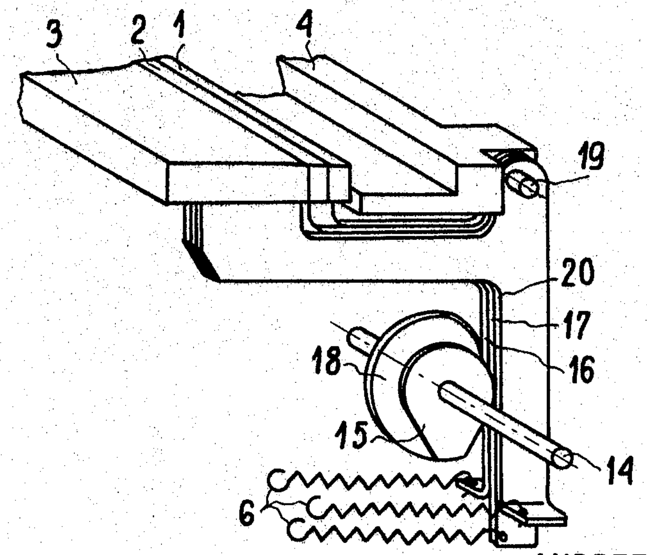
FIG. 7 is a perspective view of a third embodiment of the invention.

Spacing of the guides is controlled by means of a mechanism such as those shown in FIGS. 6 or 7. The operation of the mechanism shown in FIG. 6 is as follows:

Owing to pulling out the shaft 9 in the direction of the arrow a spring 12 is compressed. Then the shaft 9 should be revolved so that the protrusion of the disk 7 takes a position opposite the lever tail 11.

After the shaft 9 is released it is retracted by the spring 12 to its initial position. Then the disk 7 presses by its protrusion on the lever tail 11, turns it and retracts the blade 1 of the guide. During the rotation the shaft 9, a portion thereof actuates a switch 8 to turn off the idle reading detectors. A retainer 10 fixes the shaft 9 in a suitable position and does not permit its further rotation. After a successive rotation of the shaft 9 in the same direction, the successive higher disk protrusion 7 is positioned opposite to lever tails 11 and 13. The shaft 9 upon being released is retracted by the spring 12 to its initial position and at the same time retracts blades 1 and 2 of the guide by means of levers 11 and 13.

In order for the mechanism to operate properly, the force of springs 6 acting on levers 11 and 13 must be smaller than that affected by the action of the spring 12.

Operation of the mechanism shown in FIG. 7 is as follows:

Owing to the revolution of a shaft 14, a cam 18 causes a rotation of a lever 16 and retracts the blade 1, causing an enlarging of the width of the guide. During further rotation of the shaft 14 a second cam 15, fitted on the shaft 14, retracts additionally the blade 2 by means of a lever 17 and enlarges the width of the guide.

The device described above is featured by an easy service, because the variation of spacing of the guides is performed by means of a single handwheel with a simultaneous switching off of idle reading detectors. Owing to a notable length of guides the tape is guided dependably, is not damaged and the guides are worn slowly.

Figure 8A:
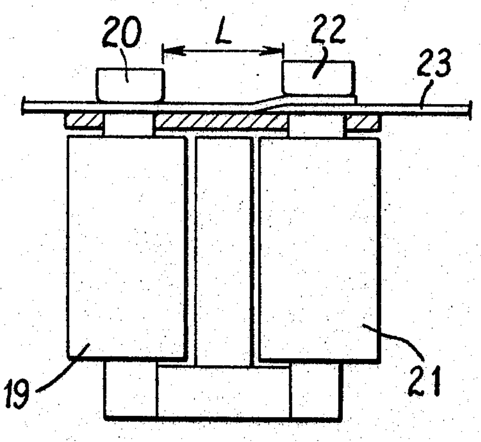
FIGS. 8A and 8B show the braking system for the tape.
Figure 8B:
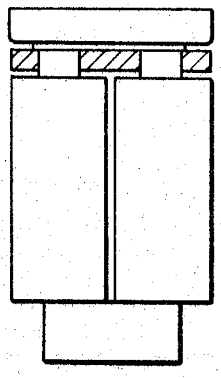

The braking system shown in FIG. 8 consists of an electro-magnet 19 and of its armature 20 pressing the tape 23 and forming the first brake and of an electromagnet 21 with its armature 22 forming the second brake. In the case of a joined tape, if the length of the joint is smaller than the distance between the brakes, one of the brakes presses always on a non-glued section of the tape.

Figure 9:
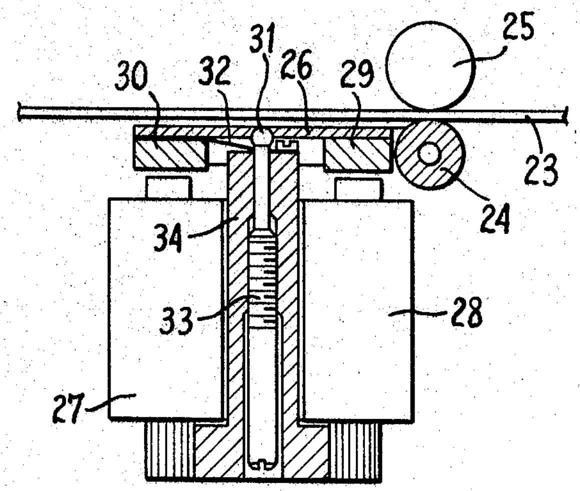
FIG. 9 shows the driving system for the tape.

The structure and operation of the power transmission system shown in FIG. 9 are as follows:

In the course of driving the tape 23, the electromagnet 27, by means of a lever 26, presses the tape with a pressing roll 24 against a driving roll 25. At the moment of braking the tape by the brake, the electromagnet 28 is energized, and the armature 30 located on the opposite arm of the lever 26 is released so that the pressing roll 24 is violently moved away from the tape 23. After the braking is finished, the electromagnet 28 is de-energized and the leaf spring fitted by one end to the lever 26 and by the second end to the housing of electromagnets 34 causes a slight pressing of the pressing roll 24 against the driving roll 25.

The system is ready for starting, which follows as the electromagnet 27 is energized and the brake electromagnets 19 and 21 are de-energized.

In order to secure a self-positioning of the lever 26 so that the pressing roll 24 is uniformly pressed against the driving roll 25, the lever 26 is pivotally mounted on member 31. The leaf spring 32 secures the parallelism of the axes of the rolls 24 and 25. By means of turning the control screw 33 the width of the air-gap between the armature 30 and the electromagnet 27 may be regulated and also, in any smaller degree, the air-gap between the armature 29 and the electromagnet 28. And so the pressing force of the pressing roll 24 against the driving roll 25 may be controlled.

The system described above is featured with a notably short braking distance of non-glued tape, as well as of the tape glued on strapped joint or lap joint. Breaking away the roll 24 at the time of braking also shortens the braking distance. After the braking has been completed, the pressing roll 24 is slightly pressed against the driving roll 25. Moving the pressing roll away in the course of braking has no destructive influence upon the distance and time of starting. These features make the described system especially suitable for application in rapid reading devices of perforated tape (reading speed of 1000 rows per second or more) used in electronic digital computers.

What we claim is:

1. In a perforated tape reader, a device for varying the spacing of tape guides comprising an L-shaped fixed blade forming a tape supporting surface and one side of the tape guide, at least one movable blade mounted adjacent said fixed blade opposite said one side, and actuating means movably mounted to operatively contact and selectively lower the movable blade to the level of said supporting surface.

2. A device according to claim 1 in which said actuating means comprises a longitudinally shiftable, spring biased shaft, a disk mounted on said shaft and having protrusions of stepwise increasing radii, lever means connected to each of said at least one movable blade, revolution of said shaft causing said protrusions to selectively actuate said levers in dependence upon the width of the protrusion to selectively retract the movable blades.

3. A device according to claim 1 in which said actuating means comprises a rotatable shaft having at least one cam portion thereon, lever means connected to each said at least one movable blade and responsive to said cams to selectively lower the movable blades.

4. A device according to claim 1 further comprising means for reading the width of the tape, said means being mounted at said tape supporting surface and extending transverse to the longitudinal axis of the tape.

References Cited

UNITED STATES PATENTS 3,119,539 1/1964 Dodsworth ---------- 226—199

ALLEN N. KNOWLES, Primary Examiner

U.S. Cl. X.R.

226—176, 195, 199